United States Patent
Kubota et al.

(10) Patent No.: US 7,079,925 B2
(45) Date of Patent: Jul. 18, 2006

(54) AGENT APPARATUS

(75) Inventors: Tomoki Kubota, Tokyo (JP); Koji Hori, Tokyo (JP); Hiroaki Kondo, Tokyo (JP); Manabu Matsuda, Tokyo (JP); Kazuhide Adachi, Tokyo (JP); Tadashi Hirano, Tokyo (JP)

(73) Assignee: Kabushikikaisha Equos Research, Tokyo (JP)

( * ) Notice: Subject to any disclaimer, the term of this patent is extended or adjusted under 35 U.S.C. 154(b) by 217 days.

(21) Appl. No.: 10/482,021

(22) PCT Filed: Sep. 25, 2002

(86) PCT No.: PCT/JP02/09867

§ 371 (c)(1), (2), (4) Date: Dec. 29, 2003

(87) PCT Pub. No.: WO03/029053

PCT Pub. Date: Apr. 10, 2003

(65) Prior Publication Data

US 2004/0172172 A1    Sep. 2, 2004

(30) Foreign Application Priority Data

Sep. 28, 2001    (JP) .............................. 2001-303606

(51) Int. Cl.
*G05D 1/00*    (2006.01)

(52) U.S. Cl. ............................ 701/1; 701/207; 701/36; 340/438

(58) Field of Classification Search ................ 701/1, 701/51, 72, 117, 207, 208, 209, 210, 211, 701/213, 36; 340/996, 438, 457, 460, 461, 340/490, 504, 505, 573, 988, 436, 576, 439
See application file for complete search history.

(56) References Cited

U.S. PATENT DOCUMENTS

| | | | | |
|---|---|---|---|---|
| 6,009,355 A | * | 12/1999 | Obradovich et al. | 701/1 |
| 6,092,005 A | * | 7/2000 | Okada | 701/1 |
| 6,101,443 A | * | 8/2000 | Kato et al. | 701/210 |
| 6,115,668 A | * | 9/2000 | Kaneko et al. | 701/207 |
| 6,154,123 A | * | 11/2000 | Kleinberg | 340/436 |
| 6,351,698 B1 | * | 2/2002 | Kubota et al. | 701/51 |

FOREIGN PATENT DOCUMENTS

| | | |
|---|---|---|
| JP | 11-37766 | 2/1999 |
| JP | 2000-221049 | 8/2000 |
| JP | 2001-235343 | 8/2001 |

* cited by examiner

*Primary Examiner*—Richard M. Camby
(74) *Attorney, Agent, or Firm*—Bacon & Thomas, PLLC

(57) ABSTRACT

Apparatus for collecting information pertaining to a driver of the vehicle includes a unit for determining if the current load on the driver is a "low-load" in terms of satisfaction of one or more specific conditions. Driver information is stored and supplemented by answers to question scenarios communicated to the driver only when a "low-load" state is determined. A question information storage unit contains various question scenarios correlated with different items of driver information and from which a question scenario, corresponding to driver information not yet obtained, is retrieved for output when a "low load" is determined.

8 Claims, 7 Drawing Sheets

FIG. 4

| ID | |
|---|---|
| NAME | |

| AGE | | | GENDER | |
|---|---|---|---|---|
| MARITAL STATE | | | PRESENCE OF CHILD | |

| HOBBIES AND PREFERENCES DATA | ITEM | DETAILED ITEM | | | |
|---|---|---|---|---|---|
| | | | | | ... |
| | | | | | ... |
| | | | | | ... |
| | | | | | ... |
| | | | | | ... |
| | | | | | ... |
| | | | | | ... |
| | : | : | : | : | |

AGENT APPARATUS

TECHNICAL FIELD

This invention relates to an agent apparatus which synthesizes a likeness of a human agent and, specifically, to an agent apparatus which automatically collects information on a vehicle driver through conversation between the driver and the agent.

BACKGROUND ART

An agent apparatus which presents an image of an agent within a vehicle, which actively engages in communication such as conversation with a user and senses a condition of the vehicle is proposed in the Japanese Patent Laid-open No. Hei 11-37766.

In use of the agent apparatus, for example, the remaining quantity of fuel such as gasoline, light oil, or the like is detected, the detected quantities immediately prior to the past five refuelings are stored, and when the average value thereof is reached, time to refuel is announced by the agent.

In such an agent apparatus, the more information on a user is collected, the more information desired by the user can be provided and the more conversations can be carried out. Accordingly, it is important for an agent apparatus to collect as much information on a driver as possible.

However, in the various agent apparatuses previously proposed, the user himself/herself inputs each item of information, e.g. hobbies and preferences, as driver information as an initial step when the use of the agent apparatus is commenced.

As described above, since the prior art apparatus is dependent on the input by the user to collect the driver information, the burden of inputting on the user is large, even when only the bare minimum of information (essential input items without which a startup is impossible) is obtained.

The present invention seeks to solve the above problem, and it is an object of the present invention to collect information on a driver to the extent possible while placing the smallest possible burden on the driver.

DISCLOSURE OF THE INVENTION

The present invention attains the aforesaid object by providing an agent apparatus including: a load-on-driver detector to detect a work load on a driver; a question output means for outputting questions about the driver when a low-load state is detected by the load-on-driver detector; and an information receiver to obtain information on the driver based on the driver's replies to the questions.

The agent apparatus may further include driver information storage for storing driver information and question information storage for storing questions to obtain the driver information. The question output means referred to above reads out, from the question information storage, a question which corresponds to an item of driver information not stored in the driver information storage and outputs the question.

Furthermore in the present invention, in the agent apparatus described the state of the driver detected by the condition detector referred to above is at least one of driving and equipment manipulation. The load on the driver determined by the load-on-driver determiner referred to above is at least one of the work load imposed by driving and extent of vexation felt by the driver.

Moreover in the present invention, an agent presenter presents, as an agent, an artificial pseudo-living organism within the vehicle is provided, and the agent poses questions through at least one of a display screen and voice output.

BRIEF DESCRIPTION OF THE DRAWINGS

FIG. 4 is a table showing composition of driver information in the agent apparatus.

DESCRIPTION OF THE PREFERRED EMBODIMENT

Figure 1:
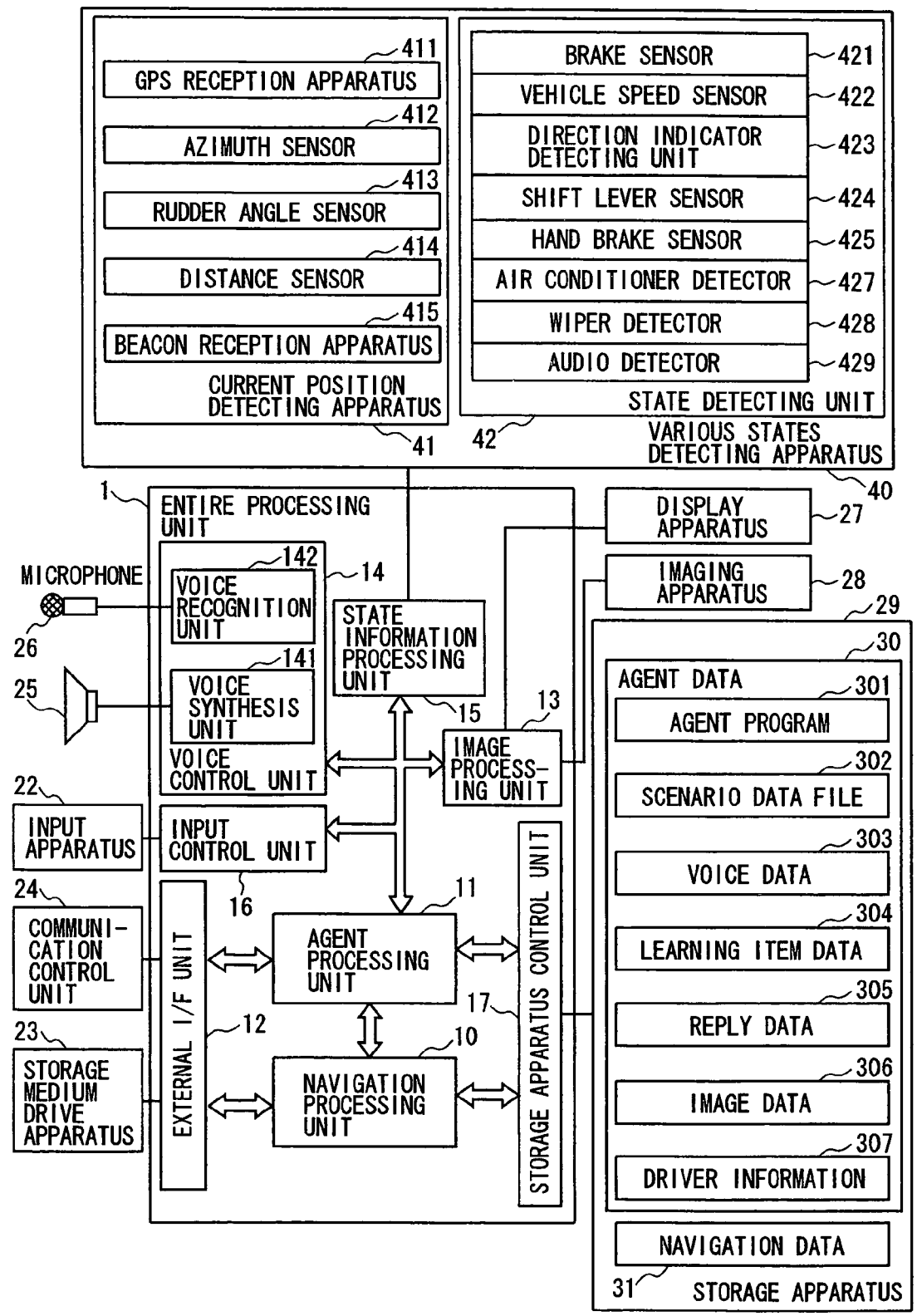
FIG. 1 is a block diagram showing structure of an agent apparatus which collects driver information in accordance with an embodiment of the present invention.

Hereinafter, a preferred embodiment of a driver information collecting apparatus in accordance with the present invention will be explained in detail with reference to FIGS. 1 to 7.

(1) Overview of the Embodiment

In an agent apparatus embodying the driver information collecting apparatus in the present embodiment, a personified agent is presented as a screen image (a two-dimensional image or three-dimensional image via holography, or the like) for communication with a driver.

Driver information pertaining to the driver such as age, gender, and hobbies, necessary for communications and the like with the agent according to preferences of the driver (user), is obtained and supplemented by questioning by the agent.

The questions for obtaining the driver information are posed by the agent, taking into account the load of the driving or manipulation of various items of equipment by the driver, and when in a low-load state, questions related to driver information which has not yet been obtained are output (through voice and image) in the order of highest priority.

By the driver's replies to the questions posed by the agent, the driver information is obtained and stored, which is then reflected in communications with the driver and the behavior of the agent.

For example, when the driver travels a straight road at a constant speed, without particularly listening to music or the like for a predetermined period of time or more, the agent asks the driver what type of cuisine he/she likes (driver information of the highest priority which has not been obtained). The reply from the driver is stored in the driver information (data on hobbies and preferences), and thereafter the stored data on hobbies and preferences is utilized in recommending a restaurant (meal) to the driver, with restaurants of the genre preferred by the driver given higher priority.

As described above, by outputting questions pertaining to driver information in the form of communications with the agent, the driver information can be obtained automatically, and is the driver is thereby released from the vexation of inputting all of the driver information in advance.

Further, the questions pertaining to the driver information are output at a selected time when the work load on the driver is less. In other words, no question is output when the driver is manipulating equipment such as an air conditioner, performing a driving operation including steering, listening to audio equipment or the radio, or chatting with someone in the vehicle, so as to avoid vexation of the driver.

In addition, since the apparatus obtains and stores the driver information automatically through communication between the driver and the agent, the more questions the driver answers to, the more information and communication suitable for the driver's hobbies and preferences the agent apparatus can provide.

Additionally, the agent in the present embodiment is an artificial pseudo-living organism, and its figure (two-dimensional image or three-dimensional image) is presented within the vehicle by a display apparatus. The activity of the agent is determining by learning of the state of the vehicle itself, passengers, oncoming vehicles, and so forth. Such learning includes, not only the state of the vehicles, etc., but also answers and replies from the driver. Based on the state of the vehicle at each point in time and the learning up to that time point, the agent responds with wide variation (its behavior=action and voice) to the driver and the vehicle. This allows the driver to call up a plurality of agents within the vehicle at liberty and thereby make the in-vehicle environment comfortable.

Here, the artificial pseudo-living organism (agent) in the present embodiment has the identity of a subject such as a specific person, a creature, a comic character or the like, and such a pseudo-living organism responds with action and voice in such a manner that the identity and continuity of the subject is maintained. Further, the agent in the present embodiment, whose identity and continuity are expressed as something with a unique character and which is presented in the vehicle, has a synthesized voice, image and the like that vary according to the information learned in the past even in the same vehicle state.

(2) Details of the Embodiment

FIG. 1 is a block diagram showing the structure of an agent apparatus which includes the driver information collecting apparatus of the present embodiment.

In the present embodiment, an entire processing unit 1 controls all the communication functions. The processing unit 1 includes: a navigation processing unit 10 which searches for a route to the set destination and performs guidance through voice or displayed image; an agent processing unit 11; an external I/F unit 12 which interfaces the navigation processing unit 10 and the agent processing unit 11; an image processing unit 13 for processing images such as an agent image, map image, and the like, as well as inputted images; a voice control unit 14, which controls outputting of voice, such as the voice of the agent and the route guidance voice, as well as inputted voice, are controlled; a state information processing unit 15 for processing the detected data for various states of the vehicle or the driver; an input control unit 16; and a storage apparatus control unit 17.

The agent processing unit 11 determines the work (driving) load on the driver from the detected data for states inside and outside of the vehicle, the state operating of by the driver, and so forth, and asks questions to obtain the driver information which has not yet been accumulated when the load on the driver is low, to obtain and save the driver information from the reply as described later.

The navigation processing unit 10 and the agent processing unit 11 include a CPU (central processing unit) to control the data processing and the operations of each unit, and a ROM, a RAM, a timer and so forth connected to the CPU through bus lines such as a data bus, a control bus, and the like. The processing units 10 and 11 are connected by a network (in-vehicle LAN (local area network)) in a manner that the processed data can be exchanged therebetween.

The ROM is a read-only memory for storing in advance various data and programs for performing control functions by the CPU, and the RAM is a random access memory which the CPU uses as a working memory.

In the navigation processing unit 10 and the agent processing unit 11 in the present embodiment, the CPU reads the various programs stored in the ROM, and executes the various programs. Note that the CPU may read a computer program from an external storage medium set in the storage medium drive apparatus 23, store (install) the program in another storage apparatus such as agent data storage apparatus 30, navigation data storage apparatus 31 or a hard disk (not shown), read (load) a necessary program or the like from the storage media into the RAM, and execute it. Further, a program may be executed by reading directly from the storage medium drive apparatus 23 into the RAM.

In the present embodiment, the agent processing unit 11 creates various types of communicating behavior of the agent in conversation with the driver and control of operations to be performed in the navigation processing section 10, by assuming various conditions of the vehicle or the driver as well as input of driver information. In other words, where various conditions such as vehicle speed, time, travel region, temperature, remaining volume of gasoline, psychological distance, and driver information are the scenario startup conditions and the scene branching conditions, the actions to be taken by the agent for each condition are defined as a scenario for that condition.

Each scenario consists of a plurality of continuous scenes. A scene is a stage in a scenario, in which the agent poses a certain question, or provides information. Each scene is composed of a title, list, word balloon, background, and other small units (parts).

The scenes proceed in sequence according to the scenario. Depending on the scenario, a plurality of scenes are selected and presented according to the driver's reply to a question posed in a certain scene, the situation of the vehicle, and the like. In other words, there are scenarios in which a scenario branches and a branch is selected and followed according to a reply in the course of the scenario.

The data for the scenarios including the scenes are stored in the scenario data file 302 which will be described later. Correlated with a scene and stored as scenario data 1 to n of the scenario data file 302 are: the information to define when and where to execute a scenario (scenario startup condition), the data defining what behavior or conversation is to be performed by the agent and how the screen is to be arranged, data for instructions to be issued to a module such as the navigation processing unit 10 and so forth, and data for determining which scene should be selected, responsive to some event.

Figure 2:
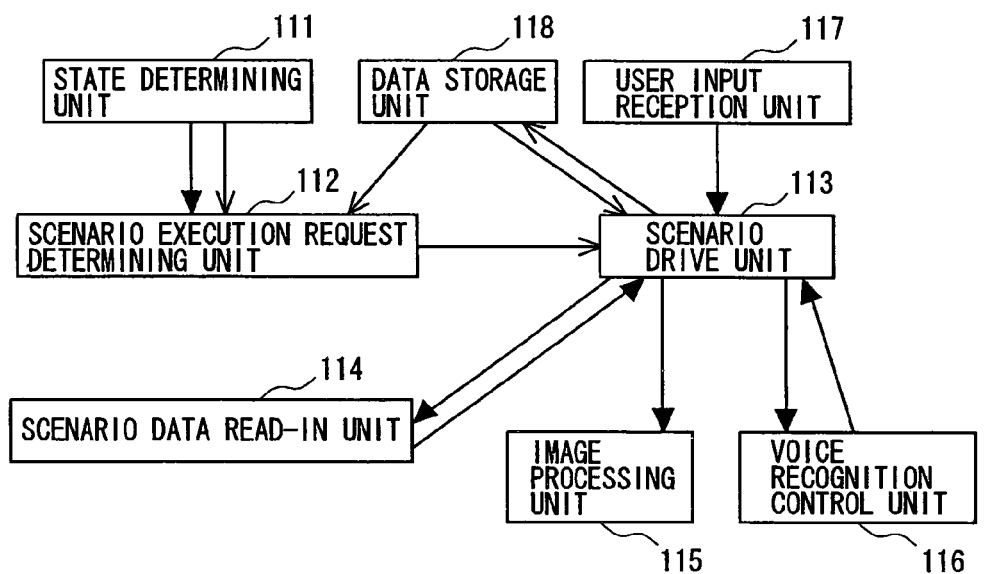
FIG. 2. is a block diagram showing the agent processing unit in the agent apparatus of FIG. 1.

FIG. 2 shows the structure of the agent processing unit 11.

As shown in FIG. 2, the agent processing unit 11 includes a state determining unit 11, a scenario execution request determining unit 112, a scenario drive unit 113, a scenario data read-in unit 114, an image processing unit 115, a voice recognition control unit 116, a user input reception unit 117, and a data storage unit 118.

Each of the units 111 to 118 are in the form of corresponding engine (software program) stored in the CPU, the ROM, and so forth provided in the agent processing unit 11.

The engine constituting each unit, such as the state determination unit 111 and the like, communicates events by transmitting data to other engines. The outputs of units 111 to 118 do not determine whether a scene should branch or not.

The state determining unit 111 is equipped with an API (application programming interface) for notification of a change in a state of time, place, various inputs, or the like. The state determining unit 111 issues a command to the scenario execution request determining unit 112 according to a change in such conditions (the set destination or the like).

The scenario execution request determining unit 112 refers to, through the API function, the determined conditions and inputs "states", and determines whether or not to execute a scenario. When a scenario is to be executed, a command requesting startup of the scenario is issued to the scenario drive unit 113.

Responsive to the scenario startup request issued by the scenario execution request determining unit 112, the scenario drive unit 113 determines whether or not to perform the startup.

When it is determined to execute the startup, the scenario drive unit 113 requests the scenario data read-in unit 114 to read the scenario data. Further, according to the scenario data, the scenario driver unit 113 forwards a request for image processing and a request governing the character's motions to the image processing unit 115. The scenario driver unit 113 also notifies the voice recognition control unit 116 of a dictionary used for the voice reorganization according to the scenario data. Further, the scenario drive unit 113 drives the scenario (controls the transition of scenes) in accordance with the results of voice recognition or inputs by the user.

In addition, the scenario drive unit 113 drives the scenario (controls the transition of scenes) by referring to the records such as the driver information in the data storage unit 118 through the API function.

The scenario data read-in unit 114 reads pertinent scenario data from the scenario data file 302 based on the request from the scenario drive unit 113. The scenario data read-in unit 114 also reads image data as commanded by the request from the scenario drive unit 113.

The image processing unit 115 renders an image of a corresponding scene or of the character (agent) based on the request from the scenario drive unit 113.

The voice recognition control unit 116 controls the instructions to a voice recognition unit 142. For example, the voice recognition control unit 116 specifies a dictionary for use as instructed by the scenario drive unit 113. When the results of voice recognition utilizing the specified dictionary are output by the voice recognition unit 142, the voice recognition control unit 116 issues a command corresponding to the recognized result to the scenario drive unit 113.

The user input reception unit 117 issues to the scenario drive unit 113 a command corresponding to the input from the user. Whether a user has input information is determined by the information from the input control unit 16.

The data storage unit 118 includes an API function to record the driver information and the like, and an API function to output the driver information and the like.

Incidentally, while the components of the agent processing unit 17 have been explained for the case of issuing a command and the case of using the API function, the event issuing may be applied to all the units, or the API function usage may be applied to all the units.

In FIG. 1, the storage medium drive apparatus 23 and a communication control unit 24 are connected to the external I/F unit 12; a display apparatus 27 and an imaging apparatus 28 are connected to the image processing unit 13; a voice output apparatus 25 and a microphone (voice receiver) 26 are connected to the voice control unit 14; a device 40 for detecting various states is connected to the state information processing unit 15; and an input apparatus 22 is connected to the input control unit 16.

The detecting device 40 includes a current position detecting unit 41 and a driving operation detecting unit 42. The current position detector 41 detects absolute position (longitude and latitude) of the vehicle, and may include a GPS (global positioning system) receiver 411 which measures the position of the vehicle by using signals from an artificial satellite, an azimuth sensor 412, a rudder angle sensor 413, a distance sensor 414, a beacon receiver 415 for receiving positional information from beacons arranged along a road, and so forth.

While the GPS receiver 411 and the beacon receiver 415 are each capable of determining a location on its own, in a place where reception by the GPS receiver 411 or the beacon receiver 415 are impossible, current position is detected by a dead-reckoning navigation method using both the azimuth sensor 412 and the distance sensor 414.

The azimuth sensor 412 may be, for example, a geomagnetic sensor which determines the azimuth of the vehicle by detecting geomagnetism, a gyro such as a gas-rate gyro or an optic-fiber gyro which determines the azimuth of the vehicle by detecting the roll angular velocity of the vehicle and integrating the angular velocity, wheel sensors arranged sensors at the right and the left wheels for detecting the turning of the vehicle by the output pulse difference (moved distance difference), or the like.

The rudder angle sensor 413 detects a steering angle □ by using an optic rotation sensor installed on a rotating component of the steering system, a rotary variable resistor, or the like.

The distance sensor 414 employs various methods, for example, a method which detects and counts the number of rotations of the wheel, or a method which detects the acceleration and integrates it twice.

The distance sensor 414 and the rudder angle sensor 413 also function as driving operation state detectors.

The driving operation detecting unit 42 includes a brake sensor 421, a vehicle speed sensor 422, a direction indicator detector 423, a shift lever sensor 424, and a handbrake (parking brake) sensor 425.

Further, the driving operation detecting unit 42 includes an air conditioner detector 427, a wiper detector 428, and an audio detector 429 functioning as equipment manipulation detectors for detecting manipulation of equipment.

The brake sensor 421 detects whether or not the foot brake is engaged (pressed).

The vehicle speed sensor 422 detects the speed of the vehicle.

The direction indicator detector 423 detects whether or not the driver is manipulating the direction indicator, as well as whether or not the direction indicator is flashing.

The shift lever sensor 424 detects whether or not the driver is manipulating the shift lever, as well as the position of the shift lever.

The handbrake (parking brake) sensor 425 detects whether or not the driver is manipulating the hand brake, as well as the state of the hand brake (engaged or released).

The air conditioner detector 427 detects whether or not the driver is manipulating the various switches and the like of the air conditioner.

The wiper detector 428 detects whether or not the driver is manipulating the wiper.

The audio detector 429 detects whether or not the driver is manipulating the audio equipment such as a radio, CD player, and cassette player, and whether or not the audio equipment is operating to produce an audio output.

The driving operation detecting unit 42 includes, as other equipment manipulation detectors, a light detecting sensor to detect the operation of the headlights, dome lights, and the like, a seatbelt detecting sensor to detect the fastening and unfastening of the seatbelt by the driver, and other sensors.

The input apparatus 22 allows the driver to input the driver information, and serve as one of the means to respond to all of the remaining questions and the like by the agent.

The input apparatus 22 also provides for inputting: the current position at the start of driving (starting point) and the destination (arrival point) for the navigation processing; a selected traveling environment for the vehicle e.g. one which would allow transmission of a request for information such as traffic congestion information to an information providing station (transmission condition); the type (model) of the cell phone used in the vehicle; and so forth.

The input apparatus 22, may be a touch panel (functioning as a switch), keyboard, mouse, light pen, joystick, or remote controller utilizing infrared or the like. Audio recognition equipment may also be used. A remote controller using infrared or the like and a reception unit to receive various signals transmitted from the remote controller may also be provided.

In the remote controller, in addition to a joystick for operations such as shifting the cursor displayed on the screen, are various keys such as a menu specifying key (button) and a numeric keypad.

The input control unit 16 generates data corresponding to the content of input through the input apparatus 22 and supplies it to the agent processing unit 11 and the navigation processing unit 10. The input control unit 16 functions as the equipment manipulation detector by detecting whether or not the driver is in the process of manipulating equipment.

The storage medium drive apparatus 23 is a drive apparatus used to read a computer program from an external storage medium for the navigation processing unit 10 and the agent processing unit 11. In the computer programs stored in the storage medium, data, and the like are included.

Here, the storage medium which stores computer programs, may be a magnetic storage medium such as a floppy disk, hard disk, or magnetic tape, a semiconductor storage medium such as a memory chip or IC card, a storage medium capable of reading information optically such as a CD-ROM, MO, or PD (phase change rewritable optical disk).

Besides reading computer programs from these various storage media, if the storage media are writable storage media such as a floppy disk or IC card, the storage medium drive apparatus 23 is able to write in such storage media the data of the RAMs in the navigation processing unit 10, and the agent processing unit 11, or of a storage apparatus 29, or the like.

For example, by storing learned data such as the content for the agent functions (learning item data/reply data) or driver information in an IC card, even when the driver drives a different vehicle, such data stored in the IC card can be read out and used, so that he/she can communicate with the agent on the basis of data learned from his/her past responses. Hence, it becomes possible to present, in the vehicle, not an agent for each specific vehicle, but an agent having learned content unique to each driver.

It is also possible to store scenario data in the IC card, whereby an original scenario unique to each user is made possible.

The communication control unit 24 is capable of being connected to cell phones utilizing wireless equipment. Besides communication over the phone circuit, the communication control unit 24 is configured to provide communication with the information station which provides traffic information data such as data on traffic congestion or traffic regulation, or with a station which provides karaoke data to be used for online karaoke in the vehicle.

Further, it is also possible to transmit and receive through the communication control unit 24 the learning data for the agent functions, the scenario data file, and so forth.

The voice output apparatus 25 is composed of a plurality of speakers arranged in the vehicle, to output voice under control of the voice control unit 14 such as voice guidance when route guidance is to be provided by voice, and to output the voice and sound for the agent's conversations with the driver as well as for the agent's questions for obtaining driver information. The voice output apparatus 25 may also serve as an audio speaker.

The microphone 26 functions to input and output voice which is the subject of the voice recognition by the voice control unit 14 such as the voice input of a destination and the like in the navigation processing, and conversations between the agent and the driver (including the replies by the driver) and the like. For this microphone 26, a dedicated directional microphone so as to properly collect the voice of the driver is used.

Note that the voice output apparatus 25 and the microphone 26 together may be in the form of a hand-free unit to allow phone communication without using a cell phone.

The microphone 26 and the voice recognition unit 142 also function as a conversation detector to detect when the driver is talking with a passenger, in which case the microphone 26 and the voice recognition unit 142 function as a state detector to detect the state of the driver.

The display apparatus 27 displays a road map for route guidance processed by the navigation processing unit 10, as well as various informational images, or displays a behavior (motion pictures) by the agent composed by the agent processing unit 11 as well as various parts (components) constituting a screen layout. Further, images of the inside and outside of the vehicle taken by the imaging apparatus 28 are displayed after being processed in the image processing unit 13.

The display apparatus 27 may be a liquid crystal display, CRT, or the like.

Note that the display apparatus 27 may also be equipped with an input function, as that of the aforementioned input apparatus 22, such as a touch panel or the like.

The imaging apparatus 28 is composed of cameras equipped with CCD (charge-coupled device) to take an image, and in addition to an in-vehicle camera which takes images of the driver, cameras are arranged on the exterior of the vehicle to take images of the front, rear, right side, and left side of the vehicle. The images taken by each camera of the imaging apparatus 28 are supplied to the image processing unit 13, in which such processes as image recognition are executed and each recognized result (whether with or without a passenger, recognition of the driver, and so forth) are reflected in the communications by the agent.

The storage apparatus 29 is connected to the storage apparatus control unit 17 so as to read and write data and programs under the control of the storage control apparatus 17.

The storage apparatus 29 stores agent data 30 and navigation data 31 and programs necessary to execute various agent functions and navigation functions according to the present embodiment.

The storage apparatus 29 may be, for example, any of various types of storage media such as a floppy disk, hard disk, CD-ROM, optical disk, magnetic tape, IC card, optimal card or the like, together with a drive apparatus thereof are used.

A plurality of different storage media and drives may be used together in such a manner that, learned item data 304, reply data 305, driver information 307, and scenario data files 302 are stored in IC cards or floppy disks which are easy to carry, while the other data would be stored on a hard drive.

The agent data 30 includes various types of data which are necessary for operation of the agent, such as an agent program 301, the scenario data file 302, voice data 303, the learned item data 304, the reply data 305, the voice data 303, image data 306 for display of images of the figure or behavior of the agent, the driver information 307, and so forth.

The agent program 301 is an agent processing program for operation of the agent function.

The learned item data 304 and the reply data 305 are data learned by the agent based on the driving operations and replies by the driver.

Accordingly, in the case of the learned item data 304 and the reply data 305, the data for each driver is stored and updated (learned).

The learned item data 304 includes stored items which are the subjects of learning for the agent, such as the total number of times or the number of times per day that the ignition is turned on, and data on the remaining volume of fuel at the time of refueling averaged for the last five refuelings. According to the content of the learned item data 304, for example, the content of the greeting by the agent at the time of appearance of the agent changes based on the number of times that the ignition has been turned on, or, on the volume of the remaining fuel falling below the average of the volume of the remaining fuel for the last five refuelings, whereupon the agent suggests refueling.

The reply data 305 includes, for each predetermined scenario, the past replies by the user to the behavior of the agent and for each reply item, the time and date of the reply and the content of the reply, for a predetermined number of times. Respective instances of being ignored, rejected, or accepted (tolerated) which characterize the content of the response are determined based on the voice recognition or on the input through the input apparatus 22, and are stored.

The scenario data file 302 stores the data for various scenarios which specify behavior of the agent for each condition or scene.

Figure 3:
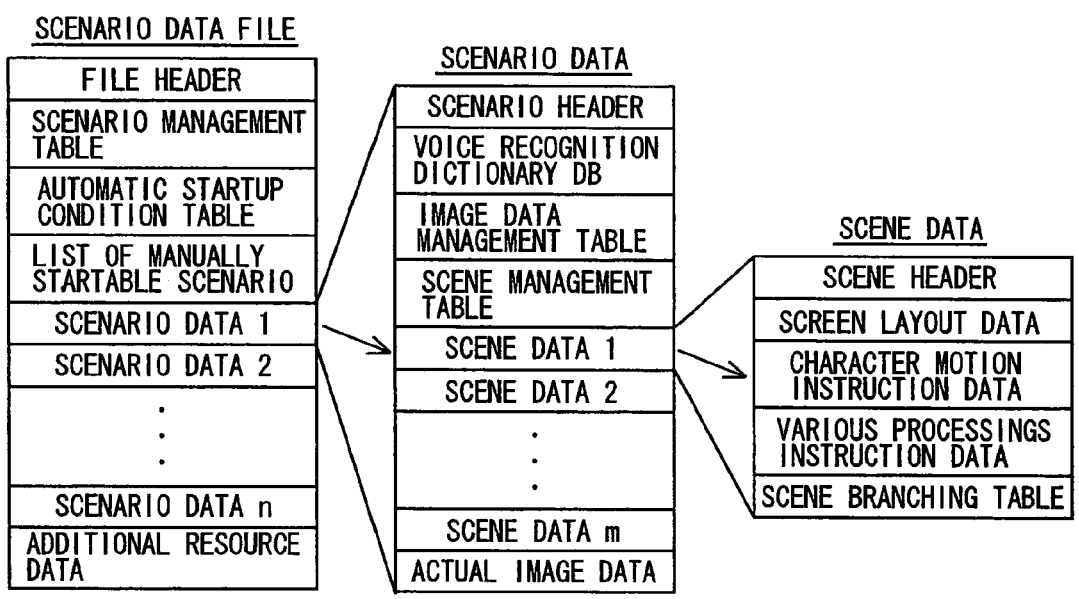
FIG. 3 is a diagram of data configuration and content in a scenario file in the agent apparatus of FIG. 1.

FIG. 3 conceptually shows the data structure and the data content of the scenario data file 302.

For the scenario data file 302, a plurality of scenario data defining each scene are aggregated to form one file.

The scenario data file 302 includes a file header, scenario management table, automatic startup condition table, list of scenarios which can be started up manually, various scenario data 1 to n, and additional resource data.

The file header is a header for a scenario file and provides information on the file.

The scenario management table stores the data for managing the scenario data stored in the scenario file, such as the data for the priorities to be followed in executing each scenario.

The automatic startup condition table specifies and stores, for each scenario, the condition which triggers automatic start up of utilization of the scenario data stored in the scenario file.

The automatic startup conditions may be arrival at a specific point and or at a distance therefrom for a specific scenario, e.g. a scenario which is executed when a point at a certain distance from a specific point A is reached Another automatic startup condition may be the turning-on of the ignition which triggers a scenario in which the agent performs a salutation at the time of the startup, and or a predetermined time after the startup.

as Also included in stored data are automatic startup prohibiting conditions which prohibit automatic startup, for example: (A) priority given to manual startup, (B) another question scenario is currently being executed (C) a question scenario has been executed within, for example, the past 30 minutes, (D) music is heard, (E) steering for a curve to the right or to the left is in progress is (F) rapid deceleration or acceleration, (G) the driver is in conversation with a passenger, (H) operation of equipment, such as a navigation apparatus, audio apparatus, air-conditioning apparatus, shift lever, handbrake, wiper, or direction indicator, (I) use of audio apparatus, e.g. listening to music or a broadcast station, prohibiting automatic startup, and (J) ongoing receipt of driving route guidance. Note that the scenario management table establishes priorities so as to allow automatic startup in case of emergency (such as in the scenario making emergency contact with the fire station or the like), even when an automatic startup prohibition condition is fulfilled. The automatic startup prohibition conditions include conditions which are applied in common to all scenarios, and the conditions which are applied only to specific scenarios.

In the present embodiment, conditions which start the question scenario, in which the agent poses questions to collect the driver information, include the following conditions, as well as other conditions which determine that the load on the driver is in a low state:

(a) The question scenario has not been performed within the past one hour (a condition which prevents the posing of questions too frequently).

(b) Fifteen minutes or more have passed since the ignition was turned on (prevents questioning immediately after the start of driving).

(c) No conversation is heard in the vehicle (by collecting sound through the microphone 26).

(d) The vehicle is driving on a straight road (as determined from the navigation data 31 and the current position), and the speed thereof has not changed for a predetermined period of time.

(e) The vehicle is waiting at a stoplight (determined from the navigation data 31, the current position, and the vehicle speed).

Whether all of the foregoing question-startup conditions are indispensable conditions or just one of them needs to be fulfilled for the startup is predetermined. For example, when being limited to the above conditions (a) to (e), the question-startup conditions are considered fulfilled and the question scenario may be started when (a) to (c) are entirely satisfied, and (d) or (e) is satisfied.

Even in this case, the question scenario is prohibited from starting when one of the automatic-startup prohibition conditions (A) described above is fulfilled.

Additionally, the startup determining routine based on the automatic startup conditions including the question-startup conditions is processed, for example, by a polling process repeated every one minute, or by an event specified in advance. Such an event specified in advance may be the setting of a destination, reception of an e-mail, or the like.

Among the respective conditions referred to above, the load on the driver is determined by the conditions (E), (F), (H), (J), (d), and (e), while the extent of vexation felt by the driver is determined by (C), (D), (G), (I), (J), (a), (b), and (c).

A list of manually startable scenarios is included among the scenarios stored in the scenario file.

As additional resource data, the voice data, image data, and the like to be added to the scenario data are also stored in the storage apparatus.

Each data file for scenarios 1 to n is composed of a scenario header, voice recognition dictionary DB, image data management table, scene management table, each scene data 1 to m, and actual image data. Each scenario includes a plurality of scenes.

The scenario header is the header section of the scenario data and contains information on the scenario.

The voice recognition dictionary DB is a DB of the voice recognition dictionary used in a scenario, and stores voice recognition dictionary data.

The image data management table stores data to specify images to be used in the scenario. The image of the agent is stored in the image data 306, and the images unique to the scenario are stored in the actual image data which is at the end of the scenario data.

The scene data management table stores data to manage the scene data stored in the scenario.

Each of the scene data files 1 to m is composed of a scene header, screen data, character motion instruction data, various routine execution instruction data, and scene branching table.

The scene header is the header section of the scene data, and stores data to manage information on the scene and each data section of the scene data.

The screen layout data is utilized to specify the screen layout in display of a certain scene, and includes data for each part of the screen layout displayed on the display apparatus 27.

The character motion instruction data includes instruction data for the motion and the content of speech by the character in a pertinent scene (data determining the voice data 303 to be used).

The various routine execution instruction data serve to request execution of a task or routine in another module (such as a navigator) in a pertinent scene.

The scene branching table consists of data for directing branching from one scene to the subsequent scene, and stores data defining the subsequent scene responsive to occurrence of an event during display of the one scene.

The voice data 303 stored in the storage apparatus 29 (FIG. 1) includes voice data for use by the agent in conducting conversations and the like with the driver according to the scene of the selected scenario, e.g. questions to be posed in order to collect the driver information according to the present invention.

Each item of voice data 303 is specified by the character motion instruction data included in the scene data.

The image data 306, provides images representing the figure of the agent to be used in each scene specified by the scenario, for example, a front facing agent image, a bowing image, a right-hand raising image, and the like.

The figures of the agent stored in the image data 306 need not be a human-like figure (male or female), and may be a figure of an animal as it is such as, for example, a chicken, dog, cat, frog, or mouse, or a figure of personified animated animal, and furthermore may be a robot-like figure or a figure of a specific character. Further, the agent need not stay in a fixed age, and may be a figure that is initially a child, growing over time, changing into a figure of an adult, and then into a figure of an old person in accordance with the learning function of the agent. The image data 306 for one of the various figures of the agent, can be selected through the input apparatus 22 or the like according to the driver's preferences.

The driver information 307 is the information on the driver, and is used to make the behavior by the agent better suit the driver's demands, tastes, and preferences.

FIG. 4 conceptually shows the composition of the driver information 307.

As shown in FIG. 4, the driver information 307 includes the basic driver data such as the driver's ID (identification data), name, age, gender, marital state (married or not married), having or not having a child, the number of children, and the age of the children, as well as data on hobbies and preferences.

The hobbies and preferences data are composed of the major items such as sport, dining, and travel, and specific detailed items included in each major item. For example, a major item may include detailed data on the favorite soccer team, favorite baseball team, interest in golf, and the like.

In the present embodiment, priorities are set for the items of driver information, and the agent poses a question to elicit driver information not yet stored, in the order of descending priorities. The priority of the basic driver data is higher than that of the hobbies and preferences data.

The questions to obtain the driver information are asked by outputting the voice data specified in the character motion instruction data in the question scenario stored in the scenario data file 302.

The question sentences for the agent to obtain the driver information in the question scenario are illustrated by the following sentences:

"What is your name?"
"Will you tell me your age?"
"Will you tell me your gender?"
"What is your hobby?"
"Are you interested in baseball?"
"Are you interested in golf?"
"Are you interested in soccer?"
"Are you interested in music?"
"Which genre of music do you like?"
"What is your favorite soccer team?"
"What is your favorite baseball team?"
"Do you like hamburger?"
"When you dine out, do you go to a family restaurant most of the time?"

These questions are stored as the character motion instruction data in the scenario data file 302 as the question sentences for each question scenario.

The data for each question sentence is delimited by each voice data stored in the voice data 302 in such a manner as, for example, "What is/your/favorite/baseball team?". The question is asked by the agent to the driver by reading out a unit of voice data corresponding to a delimited unit in the question sentence, and outputting it through the voice output device 25.

The navigation data 31 includes the data to be used for route guidance and so forth, communication region data file, picturized map data file, intersection data file, node data file, road data file, search data file, photo data file, and the like.

The communication region data file contains for each type of cell phone, communication region data to be used to display on the display apparatus 27 the region in which the cell phone used in the vehicle can communicate or to be used when searching the route.

The picturized map data file stores data for picturized maps which are picturized in the display apparatus 27. This picturized map data includes hierarchized maps, for example, map data for each tier such as, beginning with the highest tier, Japan, Kanto District, Tokyo, and Kanda. To each tier of the map data, a map code is respectively given.

Each intersection data file includes an intersection number specifying the intersection, intersection name, coordinates of an intersection (longitude and latitude), number for a road whose starting point or endpoint is at the intersection, presence of stoplights, and so forth.

The node data file includes node data such as the longitude and the latitude defining coordinates for each point on each road. In other words, node data is data defining one point along a road, and a road may be represented by an arc connecting the plural node columns.

Each road data file includes a road number specifying the road, number for an intersection being a starting point or an end point, numbers for roads having the same starting point or end point, width of the road, prohibition information such as prohibition of entry, photo number for photo data which will be referred later, and the like.

The road network data, composed of the intersection data, node data, and road data, stored respectively in the intersection data file, node data file, and road data file, are used to search a route.

The search data file includes intersection column data, node column data and the like composing the routes generated by the route search. The intersection column data includes information such as the intersection name, intersection number, number for a photo of a characteristic view of the intersection, turning point, distance, and the like. Further, the node column data includes information to indicate the position of the node such as the east longitude and the north latitude.

In the photo data file are stored photographs of a characteristic view or the like which is seen at each intersection or when traveling straight, by correlating them with a photo number, in the form of digital, analogue, or negative film.

The operations of thus structured driver information collecting apparatus will be explained next.

Figure 5:
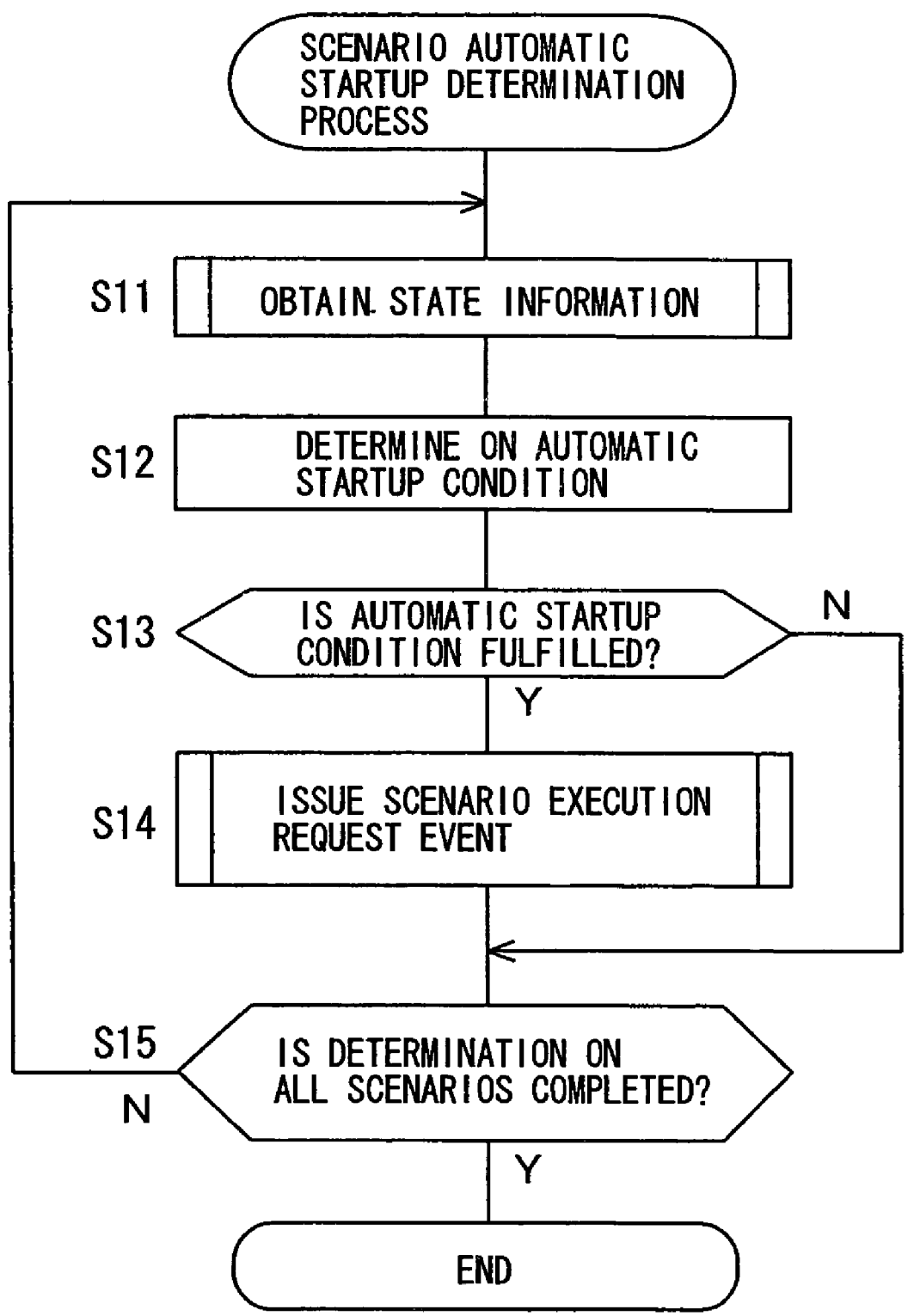
FIG. 5 is a flowchart of a scenario automatic startup determination process.

FIG. 5 is a flowchart showing operations of the scenario automatic startup determination process. The routine of the scenario automatic startup determination process performs the automatic startup determination for all the scenarios registered in a predetermined period of time (by the minute, for example). Further, when a change of a state is deemed to be substantial (for example, when a destination is set, and so forth), the state determining unit 111 issues an event signal, and the scenario execution request determination unit 112 performs determination on an automatic startup for all the scenarios when receiving the event signal.

The scenario execution request determining unit 112 in the agent processing unit 11 obtains the current state or a change of the state from various data provided by the state determining unit 111 (step 11), and determines on the scenario startup conditions (including whether or not the load on the driver is at a low state, which is the startup condition in the present embodiment) stored in the automatic startup condition table of the scenario data file 302. Further, in the present embodiment, when the event signal commands execution of a question scenario, the scenario drive unit 113 checks out the driver information which has not been collected in the driver information 307 and the priorities of the information yet to be collected, and determines a question which corresponds to the driver information of the highest priority (step 12).

Subsequently, whether the automatic startup conditions are fulfilled is determined (step 13), and when the conditions are fulfilled (1,3;Y), the scenario execution request determining unit 112 issues to the scenario drive unit 113 an execution request for the scenario which fulfills the automatic startup conditions (step 14). On the other hand, when the automatic startup condition is not fulfilled (step 13; N), the routine goes to step 15 without issuing the scenario execution request.

Subsequently, it is determined whether or not the automatic startup conditions for all the scenarios have been determined, and if not (step 15; N), the routine returns to step 11 and the determination for the next scenario is carried out. When the determinations for the all scenarios are completed (step 15; Y), the scenario execution request determination unit 112 has completed execution of the routine.

Figure 6:
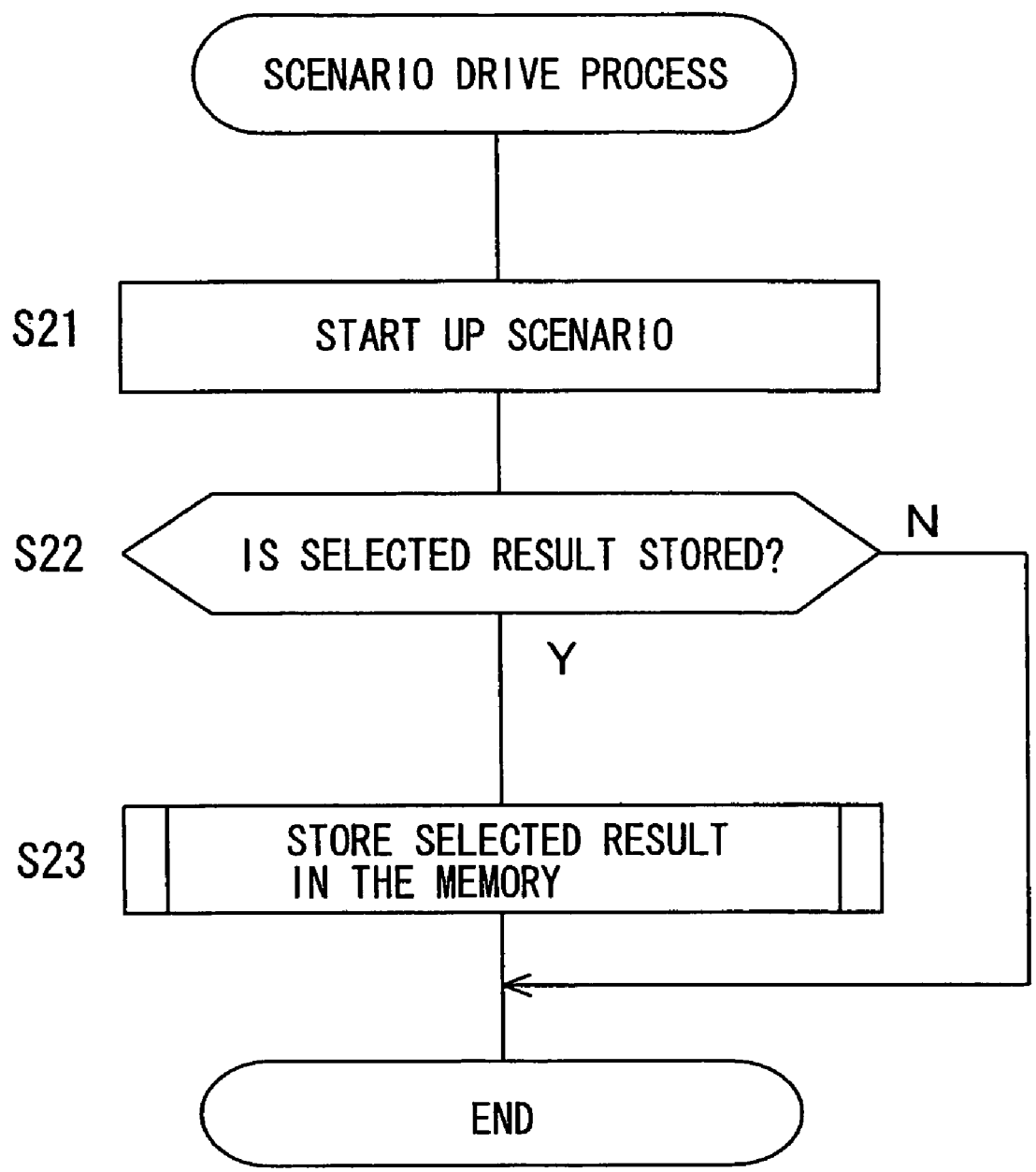
FIG. 6 is a flowchart of a scenario driving process.

FIG. 6 is a flowchart showing operations of the scenario drive processing.

Responsive to an event serving as a scenario execution request, the scenario drive unit 113 executes the scenario drive routine, and starts up the scenario which is requested (step 21)

Subsequently, the scenario drive unit 113 determines, for each scene of the requested scenario, whether or not it is instructed to store the selected result (step 22). If it is instructed to store the selected result (step 22; Y), such a result selected by the driver (a reply to the question) is stored (step 23). Hence, in the case of a question scenario, new driver information can be collected from the driver's reply and stored in the driver information 307.

After storing the driver information (step 23), or when a storage instruction is not given in the step (22;N), the routine is terminated.

Figure 7:
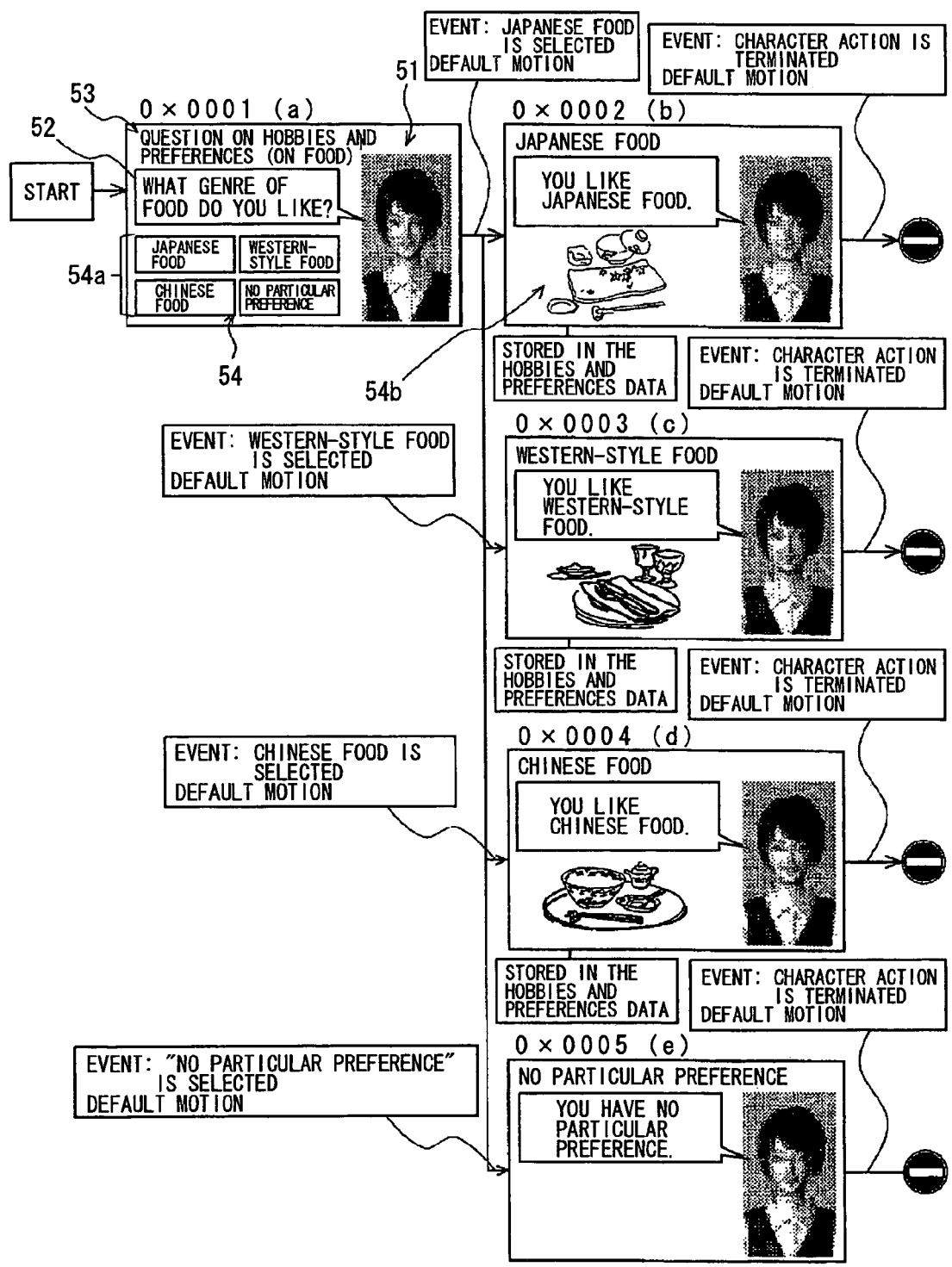
FIG. 7 shows progression of scene screens in a scenario of questions pertaining to hobbies and food preferences.

FIG. 7 shows a transition of scene screens in a question scenario for hobbies and preferences (for food) among the question scenarios.

The scene screen includes, as shown in FIG. 7 (A), an agent display screen 51 for displaying an image of the agent (still image/moving image), a word balloon screen 52 for display of a text corresponding to the voice of the agent, title screen 53, and scene display screen 54 for display of image data specific to each scene (actual image, answer selecting button, and the like).

As shown in FIG. 7, when the question scenario for preferences and hobbies (on food) is started, the agent processing unit 11 reads out, from the scenario data file 302, the screen layout data for the scene which is specified by the scene header displays it on the display apparatus 27, and at the same time outputs from the voice output apparatus 25 voice corresponding to the question.

Subsequently, the agent processing unit 11 specifies a voice dictionary to be used by the voice recognition unit 142 if the reply by the driver to the question is input by voice. In the case of the first scene 0x00001 shown in FIG. 7(a), the dictionary is specified for voice recognition for four answering buttons 54a, which are "Japanese food", "Western-style food", "Chinese food", and "no particular preference".

In the case of the question scenario in FIG. 7, the agent processing unit 11 displays, in the scene 0x0001 shown in (a), "what genre of food do you like?" in the word balloon screen 52, and at the same time outputs the voice corresponding to the presentation in the word balloon screen 52 from the voice output apparatus.

This scene, asking a question of the driver, follows a branch of plural scenes selected according to the answer by the driver (one of FIG. 7(b) to (e)).

Accordingly, when the driver selects "Japanese food" in the scene of (a), the agent processing unit 11 displays the scene screen of the branched scene 0x0002 of FIG. 7 (b). In this scene screen, "Japanese food" which has been selected is displayed in the title screen 53, at the same time the word balloon screen "You like Japanese food." is displayed, and the corresponding voice is outputted. Additionally, in the branched scene screen of FIG. 7(b), the actual image 54b of the Japanese food is read out of the scenario data and displayed in the scene display screen 54.

Further, the agent apparatus unit 11 stores the driver's answer, for example, "Japanese food" in the hobbies and preferences data of the driver information 307 (FIG. 6, step 23).

Hence, the agent processing unit displays and outputs each scene image and voice specified by the scenario in sequence until the last scene.

In the case of the question scenario of FIG. 7, the agent processing unit 11 terminates the action by the character because one of the scenes (b) to (e) is the last scene.

Further, the agent processing unit 11 terminates the routine when an ending is commanded by the driver through turning-off of the ignition or operation of an ending button (step 15; Y), and when not to be ended (step 15; N), returns to step 11 and determines if the next subsequent scenario is to be executed.

As has been explained, with the present embodiment, the agent questioning scenarios are executed, and the driver information is obtained from the answers thereto, so that the burden on the driver for inputting the data on himself/herself is reduced.

Additionally, since the question scenario by the agent stipulates a startup condition, execution of the scenario will start only when the load on the driver is low, execution of the scenario does not add to the burden of driving by the driver, and the driver is less vexed by the questions.

While only one embodiment of the driver information collecting apparatus in the present embodiment has been explained so far, the present invention is not limited to the foregoing embodiment, and various modifications thereto are possible within the scope of the claims.

For example, in the embodiment which has been described, the load on the driver is determined based on the load imposed on the driver by the driving operations and vexation of the driver, but the load may be determined based on only one of these factors.

Further, in the foregoing embodiment explained above, the scenario automatic startup conditions adopted to determine the state of the load on the driver, (A) to (J) and (a) to (e) are cited and explained, but the present invention is not limited to use of those particular conditions, and other conditions may be adopted, provided they are related to the determination of the load on the driver.

For example, conditions such as: a steering angle greater than a predetermined value; the wiper moving at a higher-than-predetermined speed; the ringtone of a cell phone; the cell phone in use; a vehicle speed V of (for example, 150) km per hour or faster; and so forth may be adopted as indicative of a high load or the driver.

Further, where a radio or television is installed on the vehicle, an automatic startup prohibition condition prohibiting start up of the question scenario when the radio or the like is ON may be adopted, As a condition giving priority to startup, the reception of a commercial may be set as a startup condition for initiation of the question scenario, combined with use of, a commercial detecting sensor.

Each of the conditions referred to above may be used by itself or in any combination with other conditions, as a condition for a specific scenario or a condition used in common for plural scenarios.

Further, in the embodiment explained above, the conditions for start up of each scenario of actions by the agent are determined in accordance with the state of vehicle, condition of the driver (including the state of the load), and the extent of learning through the agent.

Further to this, the psychological distance between the agent and the driver may be determined and added to the scenario startup conditions. As a result, the startup conditions for a specific scenario may be modified according to the physiological distance between the agent and the driver.

Here, the physiological distance between the agent and the driver is expressed by parameters such as the degree of friendliness, degree of self-confidence, degree of amenability, degree of morality, and so forth, and changes itself in accordance with the accumulated past replies and the like by the driver. For example, when words of appreciation are spoken in response to the agent's action, the the measure of friendliness is increased, and suggestions such as whether to play a CD becomes more frequent, but in contrast, when the agent is cursed, the measure of friendliness is reduced, and the actions such as actively suggesting opening of the window, playing a CD, and so forth are reduced.

Further, it is also possible to make a change into a friendly and casual way of speaking or a businesslike way of speaking, according to the stored value of the parameter for psychological distance. In this case, the character motion instruction data (see FIG. 3) for each scene should include a value for each parameter of psychological distance.

When the scenario startup conditions reflecting the psychological distance between the agent and the driver are added as referred to above, an agent psychology unit is added to the agent processing unit shown in FIG. 2. For example, this agent psychology unit may determine the psychological state of the agent based on the determination made by the state determining unit 111. Further, the agent psychology unit stores routines for changing the parameter of the psychological state of the agent, and for notification of the agent's psychological state. Subsequently, the scenario drive unit 113 refers to the psychological state of the agent, and drives the scenario based thereo, i.e. controls the transition of the scene.

With the present invention, the driver information can be automatically collected through the communications between the agent and the driver, thus reducing the burden of driver information inputting operations on the driver.

The invention claimed is:

1. A driver information collecting apparatus, for collecting information pertaining to the driver of a vehicle, comprising:
   scenario execution request determining means for commanding initiation of a question scenario responsive to determination of a low load on the driver as satisfaction of one or more of the following conditions:
   (a) a question scenario has not been executed within a past period of time;

(b) at least fifteen minutes or more has passed since the driver turned on the ignition;
(c) no conversation in the vehicle is detected;
(d) the vehicle is traveling on a straight road and its speed has not changed for a predetermined period of time; and
(e) the vehicle is waiting at a stoplight;
question output means for outputting the question scenario to obtain driver information responsive to an initiation command from said scenario execution request determining means; and
driver information storage means for storing driver information.

2. The driver information collecting apparatus according to claim 1 wherein said scenario execution request determining means determines satisfaction of at least one of the following prohibiting conditions:
  A. priority has been given to manual startup of a question scenario;
  B. another question scenario is currently being executed;
  C. another question scenario has been executed within a past predetermined period of time;
  D. play of music within the vehicle is detected;
  E. steering for a curve to the right or left is in progress;
  F. rapid acceleration or deceleration is in progress;
  G. the driver is engaged in conversation with a passenger; and
  H. the driver is operating a navigation apparatus, audio apparatus, air-conditioning control, shift lever, handbrake, wiper or direction indicator;
  I. the driver is listening to music or a broadcast station;
  J. the driver is receiving driving route guidance;
and prohibiting an initiation command when said satisfaction of at least one of said prohibiting conditions is determined.

3. The driver information collecting apparatus according to claim 1, further comprising:
  question information storage for storing the question scenarios in correlation with items of driver information to be obtained; and
  scenario drive means for reading out, from said question information storage, a question scenario correlated with an item of driver information not stored in said driver information storage means for output of the read question scenario.

4. The driver information collecting apparatus according to claim 3, wherein said scenario drive means determines priorities of items of driver information not stored in said driver information storage means and reads out the question scenario correlated with the item of driver information of the highest priority.

5. The driver information collecting apparatus according to claim 4, further comprising an agent presented in the form of an artificial pseudo-living organism in the vehicle, wherein said question output means poses a question scenario through said agent represented by at least one of an image on a display screen and voice output.

6. The driver information collecting apparatus according to claim 1, further comprising an agent presented in the form of an artificial pseudo-living organism in the vehicle, wherein said question output means poses a question scenario through said agent represented by at least one of an image on a display screen and voice output.

7. The driver information collecting apparatus according to claim 2, further comprising an agent presented in the form of an artificial pseudo-living organism in the vehicle, wherein said question output means poses a question scenario through said agent represented by at least one of an image on a display screen and voice output.

8. The driver information collecting apparatus according to claim 3, further comprising an agent presented in the form of an artificial pseudo-living organism in the vehicle, wherein said question output means poses a question scenario through said agent represented by at least one of an image on a display screen and voice output.

* * * * *